US011467993B2

(12) United States Patent
Wang et al.

(10) Patent No.: US 11,467,993 B2
(45) Date of Patent: Oct. 11, 2022

(54) DATA TRANSMISSION METHOD AND EQUIPMENT BASED ON SINGLE LINE

(71) Applicant: INSTITUTE OF GEOLOGY AND GEOPHYSICS, CHINESE ACADEMY OF SCIENCES, Beijing (CN)

(72) Inventors: Jingjing Wang, Beijing (CN); Yongyou Yang, Beijing (CN); Qingyun Di, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/384,550

(22) Filed: Jul. 23, 2021

(65) Prior Publication Data

US 2022/0075743 A1    Mar. 10, 2022

(30) Foreign Application Priority Data

Sep. 9, 2020 (CN) .......................... 202010940059.4

(51) Int. Cl.
*G06F 13/362*    (2006.01)
*G06F 13/42*    (2006.01)
*H04L 67/12*    (2022.01)

(52) U.S. Cl.
CPC ........ *G06F 13/362* (2013.01); *G06F 13/4282* (2013.01); *H04L 67/12* (2013.01)

(58) Field of Classification Search
None
See application file for complete search history.

(56) References Cited

U.S. PATENT DOCUMENTS 5,784,377 A * 7/1998 Baydar ............... H04L 41/0213
370/386
9,588,503 B2 * 3/2017 Cooper ................. G06F 3/0635
(Continued)

FOREIGN PATENT DOCUMENTS

CN        103384184 A       11/2013

OTHER PUBLICATIONS

English Translation of Second Chinese Office Action No. 2021042602161990; dated Apr. 29, 2021; pp. 9.

(Continued)

*Primary Examiner* — Henry Tsai
*Assistant Examiner* — Christopher A Bartels
(74) *Attorney, Agent, or Firm* — Cantor Colburn LLP (57) ABSTRACT

Disclosed is a data transmission method. The method includes: sending, instruction information of data transmission to a slave node in a preset first cycle; judging, by the slave node, whether data should be sent according to the instruction information of data transmission; sending the data to the a master node if the slave node judges that the data needs to be sent; and sending, by other slave nodes, the data sequentially to the master node according to a preset slave node priority, an electric potential condition and a data state of the other slave nodes in a preset second cycle. In a preset first cycle, data is actively requested from a slave node, and in a preset second cycle, other slave nodes can actively send the data to a master node according to a preset slave node priority, an electric potential condition and a data state of the other slave nodes.

6 Claims, 6 Drawing Sheets

(56) References Cited

U.S. PATENT DOCUMENTS

| | | | |
|---|---|---|---|
| 10,042,413 B2* | 8/2018 | Dustman | G06F 1/3287 |
| 11,221,606 B2* | 1/2022 | Prakash | G06F 8/65 |
| 11,232,058 B2* | 1/2022 | Jen | G06F 13/4291 |
| 2016/0338066 A1 | 11/2016 | Yang et al. | |
| 2017/0083468 A1 | 3/2017 | Sengoku | |
| 2017/0190133 A1* | 7/2017 | Hegel | B30B 11/005 |
| 2019/0011890 A1* | 1/2019 | Schmidt | G06F 13/4282 |
| 2020/0386096 A1* | 12/2020 | Sugiura | E21B 47/013 |
| 2021/0320825 A1* | 10/2021 | Banuli Nanje Gowda | H04L 25/0246 |

OTHER PUBLICATIONS

English Translation of Chinese Notice of Allowance Application No. 2021060400131570; dated Jun. 9, 2021; pp. 3.
English Translation of Chinese Office Action No. 2021022001896600; dated Feb. 24, 2021; pp. 8.

* cited by examiner

DATA TRANSMISSION METHOD AND EQUIPMENT BASED ON SINGLE LINE

This application is a Non-Provisional Application of Chinese Application No. 202010940059.4 filed on Sep. 9, 2020, entitled "DATA TRANSMISSION METHOD AND EQUIPMENT BASED ON SINGLE LINE", which is incorporated herein by reference in its entirety

TECHNICAL FIELD

The application relates to the technical field of computers, and in particular to a data transmission method and equipment based on a single line.

BACKGROUND

When equipment works, a plurality of instruments are mostly combined to work together, during which data needs to be summarized to a central control system, so that the central control system can upload the data to a ground control system. Due to space limitation, a communication bus mounted with the plurality of instruments can only be a single line. In the prior art, a method for single-line data transmission of equipment is relatively complex and cannot adapt to many scenes.

SUMMARY

In view of this, the embodiment of the application provides a data transmission method and equipment based on a single line in order to solve the problems that a method for single-line data transmission of equipment in the prior art is relatively complex and cannot adapt to many scenes.

The embodiment of the application adopts the following technical solutions:

The embodiment of the application provides a data transmission method based on a single line, and the method is applied to drilling equipment and includes:

performing, by a master node of the drilling equipment, data acquisition on a specified slave node of the drilling equipment, and sending instruction information of data transmission to the slave node through a bus in a preset first cycle;

judging, by the slave node of the drilling equipment, whether data needs to be sent or not according to the instruction information of data transmission;

sending the data to the master node of the drilling equipment through the bus if the slave node of the drilling equipment judges that the data needs to be sent;

uploading, by the slave node of the drilling equipment, the data autonomously to cope with an emergency situation of the slave node of the drilling equipment in a preset second cycle, wherein the emergency situation may be a failure alarm; and sending, by other slave nodes, the data to the master node sequentially through the bus according to a preset slave node priority, an electric potential condition of the bus and a data state of the other slave nodes; and wherein the data state of the other nodes includes data upload and no data upload;

the step of sending, by the other slave nodes of the drilling equipment, the data to the master node sequentially through the bus according to the preset slave node priority of the drilling equipment, the electric potential condition of the bus and the data state of the other slave nodes specifically includes the following steps:

judging whether there are other slave nodes sending data to the master node according to the data state of the other slave nodes;

judging, by the other slave nodes, whether the bus is at a preset electric potential or not according to the preset slave node priority if it is determined that there are other slave nodes sending data to the master node, and sending the data to the master node through the bus when it is determined that the bus is at the preset electric potential; and leaving the data upload for the next cycle if the other slave nodes fail to complete data upload after the time of the second cycle has passed;

the step of sending, by the other slave nodes, the data to the master node sequentially through the bus according to the preset slave node priority, the electric potential condition of the bus and the data state of the other slave nodes includes:

judging whether the bus is at the preset electric potential or not according to the preset slave node priority when the data state of the other slave nodes is the data upload, and sending the data to the master node through the bus when it is determined that the bus is at the preset electric potential; and detecting the electric potential condition of the bus through a data transmission detection circuit, whereat the preset electric potential is a first electric potential or a second electric potential, wherein the first electric potential is an electric potential at which a first transmission detection circuit detects that the bus is idle, the second electric potential is an electric potential at which a second transmission detection circuit detects that the bus is idle, and the first electric potential is greater than the second electric potential.

Further, the data state of the other slave nodes includes data upload and no data upload.

Further, the first transmission detection circuit includes a first sending port, a first receiving port, a bus and a first detection module, wherein, the master node and the slave nodes are all connected to a first serial port through the first sending port and the first receiving port;

the first serial port is connected to the bus; and the first detection module is connected to the first receiving port, the first sending port and the bus.

Further, the first detection module includes three units, wherein the first detection module includes a first unit, a second unit and a third unit;

a first end of the first unit is connected to the first sending port, a second end of the first unit is connected to a high electric potential, and a third end of the first unit is grounded and connected to a first end of the third unit;

a first end of the second unit is connected to the first sending port, a second end of the second unit is grounded, and a third end of the second unit is connected to the high electric potential and the bus; and the first end of the third unit is grounded and connected to the third end of the first unit, a second end of the third unit is connected to the bus, and a third end of the third unit is connected to the first receiving port and the high electric potential.

Further, the second transmission detection circuit includes a second sending port, a second receiving port, a bus and a second detection module, wherein, the master node and the slave nodes are all connected to a second serial port through the second sending port and the second receiving port;

the second serial port is connected to the bus; and the second detection module is connected to the second receiving port, the second sending port and the bus.

Further, the second detection module includes four units, wherein the second detection module includes a fourth unit, a fifth unit, a sixth unit and a seventh unit;

a first end of the fourth unit is connected to the second sending port, a second end of the fourth unit is connected to a high electric potential, and a third end of the fourth unit is grounded and connected to a first end of the fifth unit;

the first end of the fifth unit is grounded and connected to the third end of the fourth unit, a second end of the fifth unit is connected to the bus, and a third end of the fifth unit is grounded and connected to a first end of the sixth unit;

the first end of the sixth unit is grounded and connected to the third end of the fifth unit, a second end of the sixth unit is connected to the high electric potential, and a third end of the sixth unit is grounded and connected to the second receiving end; and a first end of the seventh unit is connected to the second sending port, a second end of the seventh unit is connected to the high electric potential, and a third end of the seventh unit is grounded and connected to the bus.

The embodiment of the application further provides data transmission equipment based on a single line, and the equipment includes:

at least one processor; and a memory connected to the at least one processor; wherein, the memory stores instructions executable by the at least one processor, and the instructions are executed by the at least one processor, thereby causing the at least one processor to:

perform, by a master node, data acquisition on a specified slave node in a preset first cycle, and send instruction information of data transmission to the slave node through a bus;

judge, by the slave node, whether data needs to be sent or not according to the instruction information of data transmission;

send the data to the master node through the bus if the slave node judges that the data needs to be sent;

upload, by the slave node, data autonomously in a preset second cycle to cope with an emergency situation of the slave node, wherein the emergency situation may be a failure alarm; and send, by the other slave nodes, the data to the master node sequentially through the bus according to a preset slave node priority, an electric potential condition of the bus and a data state of the other slave nodes, wherein the data state of the other slave nodes includes data upload and no data upload;

the step of sending, by the other slave nodes, the data to the master node sequentially through the bus according to the preset slave node priority, the electric potential condition of the bus and the data state of the other slave nodes specifically includes the following steps:

judging whether there are other slave nodes sending data to the master node according to the data state of the other slave nodes;

judging, by the other slave nodes, whether the bus is at a preset electric potential or not according to the preset slave node priority if it is determined that there are other slave nodes sending data to the master node, and sending the data to the master node through the bus when it is determined that the bus is at the preset electric potential; and leaving the data upload for the next cycle if the other slave nodes fail to complete the data upload after the time of the second cycle has passed;

the step of sending, by the other slave nodes, the data to the master node sequentially through the bus according to the preset slave node priority, the electric potential condition of the bus and the data state of the other slave nodes includes:

judging whether the bus is at the preset electric potential or not according to the preset slave node priority when the data state of the other slave nodes is the data upload, and sending the data to the master node through the bus when it is determined that the bus is at the preset electric potential; and detecting the electric potential condition of the bus through a data transmission detection circuit, wherein the preset electric potential is a first electric potential or a second electric potential, wherein the first electric potential is an electric potential at which a first transmission detection circuit detects that the bus is idle, the second electric potential is an electric potential at which a second transmission detection circuit detects that the bus is idle, and the first electric potential is greater than the second electric potential.

According to the at least one technical solution adopted by the embodiment of the application, the following beneficial effects can be achieved: in a preset first cycle, data is actively requested from a slave node, and in a preset second cycle, other slave nodes can actively send the data to a master node according to a preset slave node priority, an electric potential condition of a bus and a data state of the other slave nodes, thereby completing single-line data transmission.

BRIEF DESCRIPTION OF THE DRAWINGS

The drawings described herein are used to provide a further understanding of the application and form a part of the application. The schematic embodiments and descriptions of the application are used to explain the application and do not constitute an undue limitation on the application. In the drawings.

DETAILED DESCRIPTION

To make the objectives, technical solutions, and advantages of the application more clear, the technical solutions of the application will be clearly and completely described below with reference to the embodiments of the present application and corresponding accompanying drawings. Apparently, the described embodiments are merely a part rather than all of the embodiments of the application. All other embodiments obtained by a person of ordinary skill in the art based on the embodiments of the application without creative efforts shall fall within the protection scope of the application.

The technical solution provided by embodiments of the application will be described in detail below with reference to the accompanying drawings.

Figure 1:
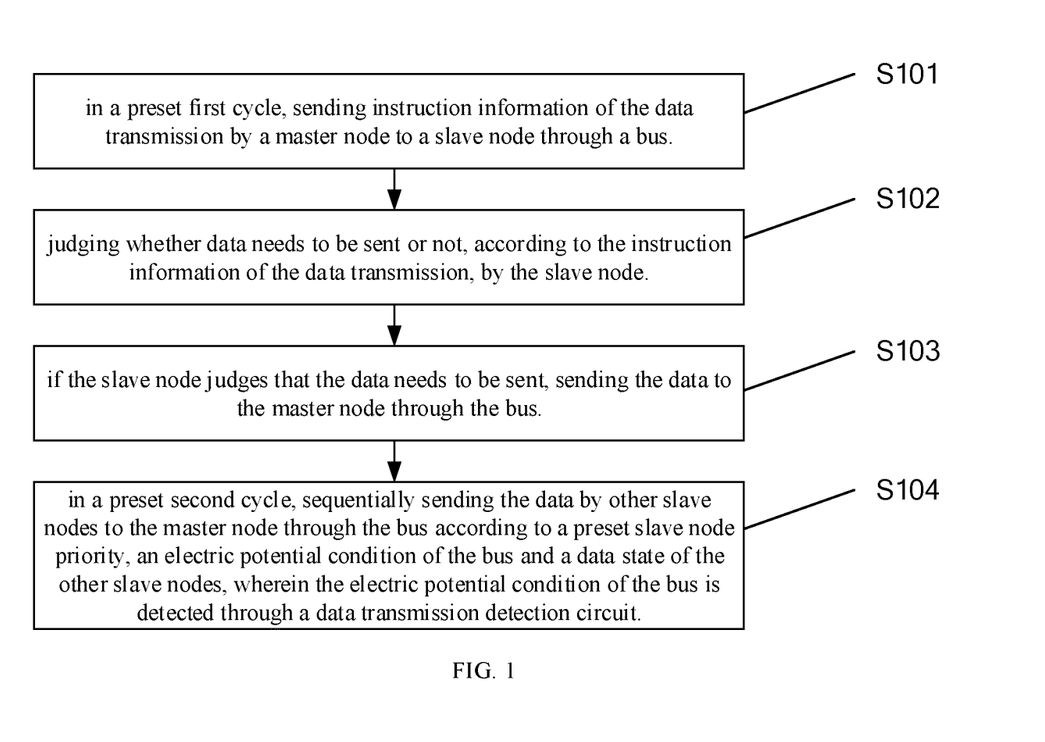
FIG. 1 is a flow diagram of a data transmission method based on a single line provided in an embodiment I of the description.

FIG. 1 is a flow diagram of a data transmission method based on a single line provided in an embodiment I of the description, which may specifically include:

step S101, sending, by a master node, instruction information of data transmission to a slave node through a bus in a preset first cycle.

In the step S101 of the embodiment of the description, there are multiple nodes in the equipment, a certain node may be selected as a master node and other nodes may be selected as slave nodes during initialization, and moreover, the master node may be numbered as 0, and the slave nodes may be numbered as 1, 2, 3 . . . n.

Step S102, judging, by the slave node, whether data needs to be sent or not according to the instruction information of data transmission.

In the step S102 of the embodiment of the description, the instruction information of data transmission sent by the master node to the slave node should include identity information of the slave node, and if there is no the identity information of the slave node in the instruction information of data transmission sent by the master node to the slave node, the slave node can determine that the instruction information of data transmission sent by the master node is wrong and terminate the operation; and if there is the identity information of the node in the instruction information of data transmission sent by the master node to the slave node, the slave node can send the data to the master node.

Step S103, sending the data to the master node through the bus if the slave node determines that the data needs to be sent.

Step S104, sending, by other slave nodes, the data to the master node sequentially through the bus according to a preset slave node priority, an electric potential condition of the bus and a data state of the other slave nodes in a preset second cycle, wherein the electric potential condition of the bus is detected through a data transmission detection circuit.

Figure 2:
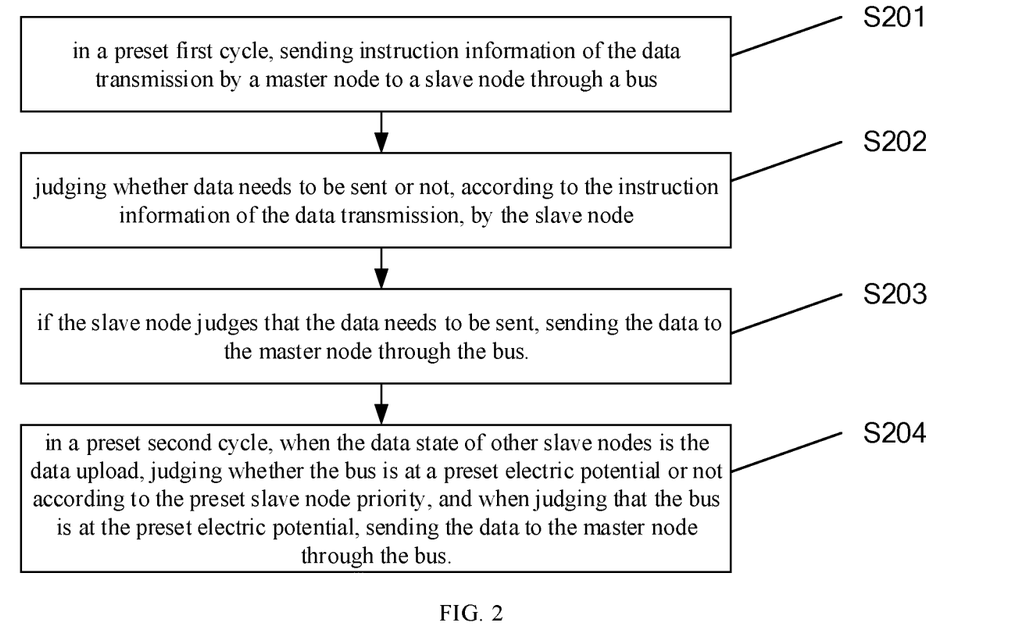
FIG. 2 is a flow diagram of a data transmission method based on a single line provided in an embodiment II of the description.

Corresponding to the embodiment I of the description, FIG. 2 is a flow diagram of a data transmission method based on a single line provided in an embodiment II of the description, which may specifically include:

step S201, sending, by a master node, instruction information of data transmission to a slave node through a bus in a preset first cycle.

In the step S201 of the embodiment of the description, there are multiple nodes in the equipment, a certain node may be selected as a master node and other nodes may be selected as slave nodes during initialization, and moreover, the master node may be numbered as 0, and the slave nodes may be numbered as 1, 2, 3, . . . n.

Step S202, judging, by the slave node, whether data needs to be sent or not according to the instruction information of data transmission.

In the step S202 of the embodiment of the description, the instruction information of data transmission sent by the master node to the slave node should include identity information of the slave node, and if there is no the identity information of the slave node in the instruction information of data transmission sent by the master node to the slave node, the slave node can determine that the instruction information of data transmission sent by the master node is wrong and terminate the operation; and if there is the identity information of the node in the instruction information of data transmission sent by the master node to the slave node, the slave node can send the data to the master node.

Step S203, sending the data to the master node through the bus if the slave node determines that the data needs to be sent.

Step S204, judging whether the bus is at a preset electric potential or not according to the preset slave node priority in a preset second cycle when the data state of other slave nodes is the data upload, and sending the data to the master node through the bus when it is determined that the bus is at the preset electric potential.

In the step S204 of the embodiment of the description, the data state of the other slave nodes includes data upload and no data upload.

Further, when the embodiment of the description is at the second cycle, the method may also include:

judging whether there are other slave nodes sending data to the master node according to the data state of the other slave nodes;

judging, by the other slave nodes, whether the bus is at a preset electric potential or not according to the preset slave node priority if it is determined that there are other slave nodes sending data to the master node, and sending the data to the master node through the bus when it is determined that the bus is at the preset electric potential.

Figure 3:
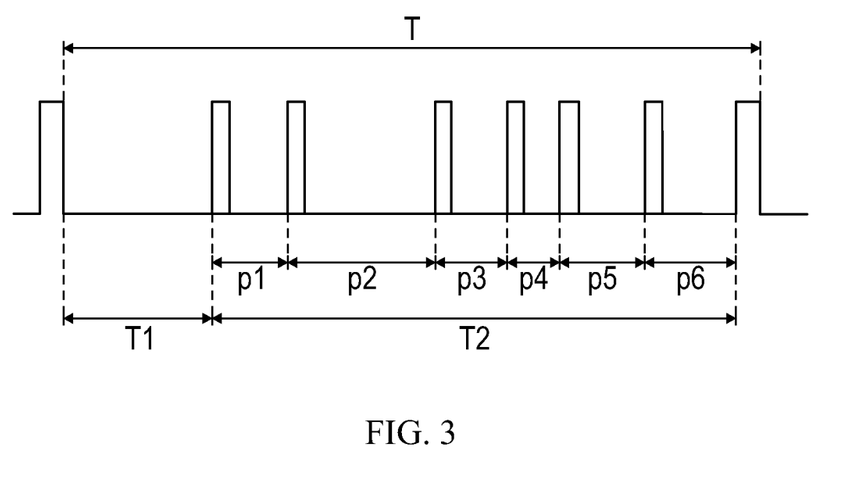
FIG. 3 is a diagram of a master node operational cycle provided in an embodiment of the description.

Further, in the second cycle, if it is determined that the other slave nodes do not need to send data to the master node, the step of the embodiment of the description also includes:

continuing to perform the next first cycle after the second cycle is over;

It should be noted that the step S201 to step S203 occur in the preset first cycle. The step S204 to step S205 occur in the preset second cycle. The first cycle and the second cycle may form the whole cycle, and all cycles have the same time, that is, the time of the first cycle and the time of the second cycle are fixed. The master node sequentially reads data information of slave nodes every first cycle and second cycle. FIG. 3 illustrates a diagram of a master node operational cycle. Wherein, the first cycle T1 is a time period at which the master node performs data acquisition on the specified slave node; during the T1 time period, the master node sends a command asking for obtaining data of a certain slave node, then releases the bus, and the master node enters a data receiving state; after receiving an instruction data packet, the slave node can firstly judge whether the master node needs to acquire data of the slave node or not, namely judge whether to send the data or not, if the master node needs to acquire the data of the slave node, the current slave node uploads the data to the master node and occupies the bus, if the master node does not acquire the data of the slave node, the current slave node continues to wait, and after the T1 time period is over, other slave nodes enter an autonomous upload mode, namely enter a T2 stage of the second cycle.

The second cycle T2 is a time period at which the other slave nodes autonomously upload data to the master node, during the T2 time period, the slave nodes are in two states (a data state and a data-free state), the state of each slave node can be determined first, and then each slave node sends the data according to the preset priority (e.g. p1, p2 . . . , pn, p1<p2<p3 . . . pn), with the strategy of: enabling the slave nodes in the data state to enter an upload mode according to a priority sequence in the T2 time period, judging whether the bus is occupied or not, namely judging whether the bus is at a preset electric potential or not before the slave nodes upload the data to the master node, if it is determined that the bus is at the preset electric potential, indicating that the bus is not occupied, enabling the slave node to enter the upload mode; and after the slave node completes the upload, other slave nodes can learn that the slave node has completed the upload, and the next slave node uploads the data to the master node.

It should be noted that due to the fact that the time of the T2 time period is limited, the data upload is to be terminated and left for the next cycle if the other slave nodes fail to complete the data upload after the time period has passed. The data uploaded by the slave node at the first cycle T1 may be the data required by the master node, and the data uploaded by the slave node at the second cycle T2 may be the data such as a failure alarm.

Figure 4:
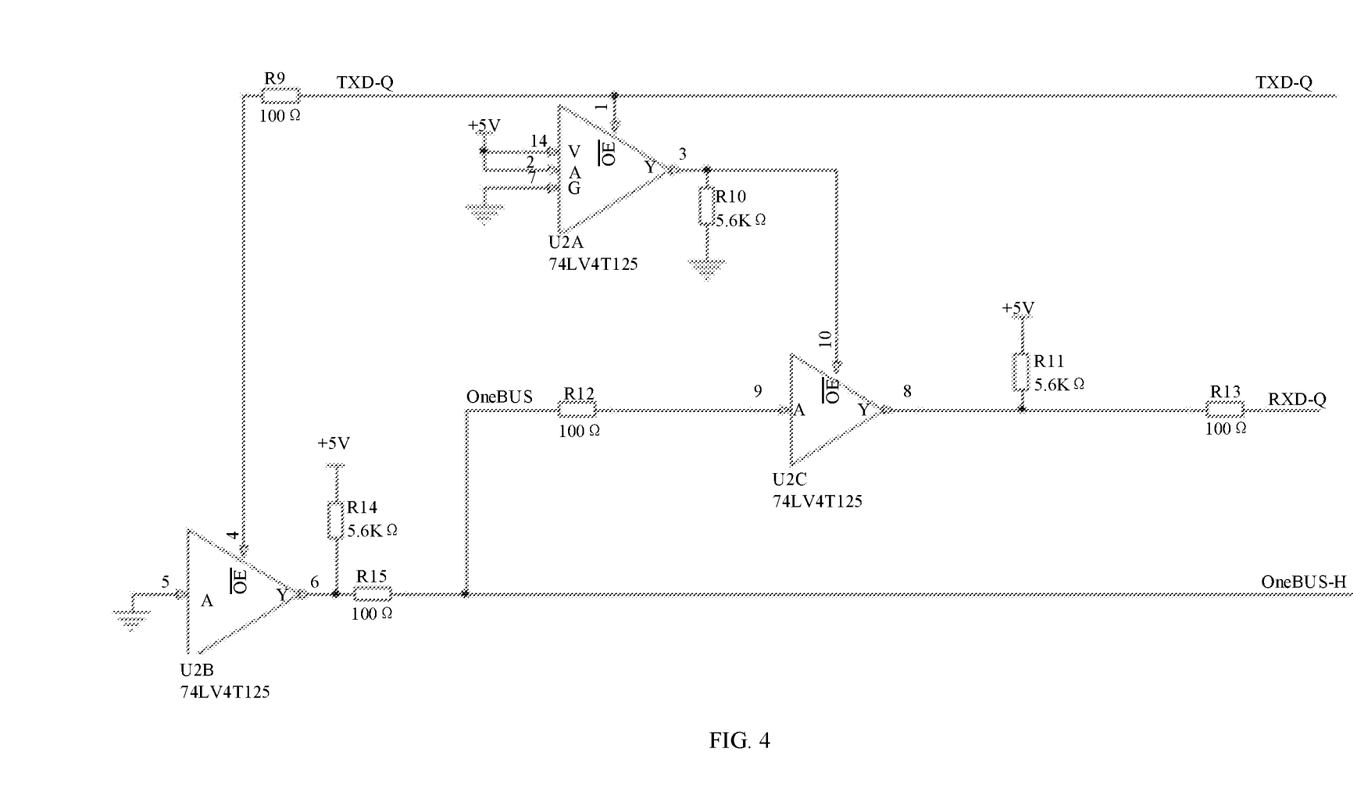
FIG. 4 is a diagram of a first transmission detection circuit provided in an embodiment of the description.
Figure 5:
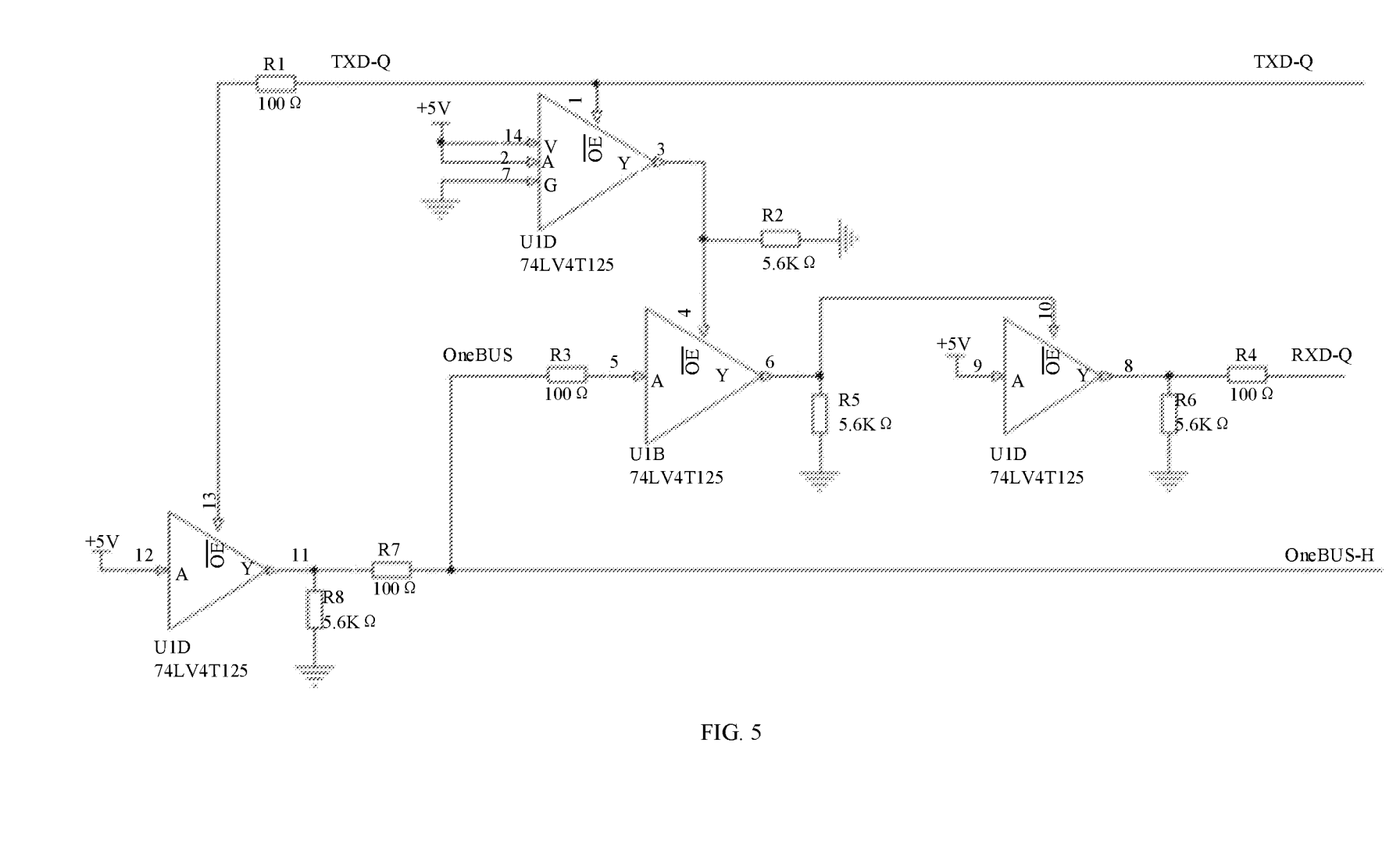
FIG. 5 is a diagram of a second transmission detection circuit provided in an embodiment of the description.

It should be noted that the preset electric potential of the embodiment of the description may be a first electric potential or a second electric potential, wherein the first electric potential is an electric potential at which a first transmission detection circuit detects that the bus is idle, the second electric potential is an electric potential at which a second transmission detection circuit detects that the bus is idle, and the first electric potential is greater than the second electric potential. For instance, the first electric potential may be a high electric potential around 5V, and the second electric potential may be a low electric potential around 0V.

In the embodiment of the description, the first transmission detection circuit may include a first sending port, a first receiving port, a bus and a first detection module, wherein, the master node and the slave nodes are all connected to a first serial port through the first sending port and the first receiving port;

the first serial port is connected to the bus; and the first detection module is connected to the first receiving port, the first sending port and the bus. Wherein the first serial port may be a UART of which the full name is Universal Asynchronous Receiver/Transmitter.

The first detection module may include three units, wherein the first detection module includes a first unit, a second unit and a third unit;

a first end of the first unit is connected to the first sending port, a second end of the first unit is connected to a high electric potential, and a third end of the first unit is grounded and connected to a first end of the third unit;

a first end of the second unit is connected to the first sending port, a second end of the second unit is grounded, and a third end of the second unit is connected to the high electric potential and the bus; and the first end of the third unit is grounded and connected to the third end of the first unit, a second end of the third unit is connected to the bus, and a third end of the third unit is connected to the first receiving port and the high electric potential.

Referring to FIG. 4, a diagram of a first transmission detection circuit is illustrated, a TXD-Q and an RXD-Q in the figure are connected to a TXD port and an RXD port of the UART (a part of an MCU) in each node (including the master node and the slave node), respectively, and the RXD port is always in a high-resistance input state. When the MCU in the node is idle, the TXD is at a high level, when a signal is sent, the TXD sends a low level as a start bit, and then the low level appears intermittently according to the sent content.

Wherein, the first unit is a U2A unit in FIG. 4, the second unit is a U2B unit in FIG. 4, and the third unit is a U2C unit in FIG. 4. A first end of the unit may be an OE end of the unit in FIG. 4, a second end of the unit may be an A end of the unit in FIG. 4, and a third end of the unit may be a Y end of the unit in FIG. 4. As shown in FIG. 4, the OE end of the U2A unit is connected to the TXD-Q and a resistor R9, the A end of the U2A unit is connected to a 5V voltage, the Y end of the U2A unit is connected to a resistor R10 and the OE end of the U2C unit, and the resistor R10 is grounded; the OE end of the U2B unit is connected to the resistor R9, the resistor R9 is connected to the TXD-Q, the A end of the U2B unit is grounded, the Y end of the U2B unit is connected to a resistor R15 and a resistor R14, the resistor R15 is connected to the bus, and the resistor R14 is connected to the 5V voltage; the OE end of the U2C unit is connected to the resistor R10 and the Y end of the U2A unit, the A end of the U2C unit is connected to a resistor R12, the resistor R12 is connected to the bus, the Y end of the U2C unit is connected to a resistor R11 and a resistor R13, the resistor R11 is connected to the 5V voltage, and the resistor R13 is connected to the RXD-Q.

Schematic diagram analysis of the first transmission detection circuit is as follows:

when a node (a master node or a slave node) sends data, the TXD-Q is at a low level, and the OE end of the U2B unit is at the low level; and due to the fact that the A end of the U2B unit is at the low level, the Y end of the U2B unit is at the low level, a OneBUS-H signal at the bus is at the low level, and the OneBUS-H signal has the same level characteristics as the TXD-Q.

When the node sends the data, the TXD-Q is at a low level, and the OE end of the U2A unit is at the low level; and due to the fact that the A end of the U2A unit is at a high level, the A end of the U2A unit is at the high level (that is, a TXD-Q signal outputs the high level through the U2A unit), the OE end of the U2C unit is at the high level, the U2C unit is at a high resistance, a OneBus signal at the bus cannot pass through the U2C unit, and the RXD-Q is at the high level, then RXD-Q at high level represents no acceptance of data.

When the node does not send the data, the TXD-Q is at the high level, the U2B unit is at the high resistance, the OneBus-H at the bus is at the high level, and data can pass through the bus when the bus is idle.

when the node does not send the data, due to the fact that the TXD-Q is at the high level and the OE end of the U2A unit is at the high level, the U2A unit is at the high resistance, the OE end of the U2C unit is at the low level, and a OneBUS data signal at the bus is sent to the RXD-Q through the U2C.

In the embodiment of the description, the second transmission detection circuit may include a second sending port, a second receiving port, a bus and a second detection module, wherein, the master node and the slave nodes are all connected to a second serial port through the second sending port and the second receiving port;

the second serial port is connected to the bus; and the second detection module is connected to the second receiving port, the second sending port and the bus. Wherein, the second serial port may be a UART of which the full name is Universal Asynchronous Receiver/Transmitter.

The second detection module may include four units, wherein the second detection module includes a fourth unit, a fifth unit, a sixth unit and a seventh unit;

a first end of the fourth unit is connected to the second sending port, a second end of the fourth unit is connected to a high electric potential, and a third end of the fourth unit is grounded and connected to a first end of the fifth unit;

the first end of the fifth unit is grounded and connected to the third end of the fourth unit, a second end of the fifth unit is connected to the bus, and a third end of the fifth unit is grounded and connected to a first end of the sixth unit;

the first end of the sixth unit is grounded and connected to the third end of the fifth unit, a second end of the sixth unit is connected to the high electric potential, and a third end of the sixth unit is grounded and connected to the second receiving end; and a first end of the seventh unit is connected to the second sending port, a second end of the seventh unit is connected to the high electric potential, and a third end of the seventh unit is grounded and connected to the bus.

Referring to FIG. 5, a diagram of a second transmission detection circuit is illustrated, a TXD-Q and an RXD-Q in the figure are connected to a TXD port and an RXD port of the UART (a part of an MCU) in each node (including the master node and the slave node), respectively, and the RXD port is always at a high-resistance input state. When the MCU in the node is idle, the TXD is at a high level, when a signal is sent, the TXD sends a low level as a start bit, and then the low level appears intermittently according to the sent content.

Wherein, the fourth unit is a U1A unit in FIG. 5, the fifth unit is a U1B unit in FIG. 5, the sixth unit is a U1C unit in FIG. 5, and the seventh unit is a U1D unit in FIG. 5. A first end of the unit may be an OE end of the unit in FIG. 5, a second end of the unit may be an A end of the unit in FIG. 5, and a third end of the unit may be a Y end of the unit in FIG. 5. As shown in FIG. 5, the OE end of the U1A unit is connected to the TXD-Q and a resistor R1, a resistor R15 is connected to the OE end of the U1D unit, the A end of the U1A unit is connected to a 5V voltage, the Y end of the U1A unit is connected to a resistor R2 and the OE end of the U1B unit, and the resistor R2 is grounded; the OE end of the U1B unit is connected to the resistor R2 and the Y end of the U1A unit, the A end of the U1B unit is connected to a resistor R3, the resistor R3 is connected to a bus, the Y end of the U1B unit is connected to a resistor R5 and the OE end of the U1C unit, and the resistor R5 is grounded; the OE end of the U1C unit is connected to the resistor R5 and the Y end of the U1B unit, the A end of the U1C unit is connected to the 5V voltage, the Y end of the U1C unit is connected to a resistor R6 and a resistor R4, the resistor R6 is grounded, and the resistor R4 is connected to the RXD-Q; and the OE end of the U1D unit is connected to the resistor R1, the A end of the U1D unit is connected to the 5V voltage, the Y end of the U1D unit is connected to a resistor R7 and a resistor R8, the resistor R7 is connected to the bus, and the resistor R8 is grounded.

Schematic diagram analysis of the second transmission detection circuit is as follows:

when a node (a master node or a slave node) sends data, the TXD-Q is at a low level, the OE end of the U1D unit is at a high level, and a OneBUS-L signal at the bus has the opposite level characteristic of the TXD-Q.

when the node sends the data, a TXD-Q signal is reversed through the U1A unit, that is, the TXD-Q is at the low level; the OE end of the U1B unit is at the high level, a OneBUS signal cannot pass through the U1B unit, and the OE end of the U1C unit obtains the low level; due to the fact that the RXD-Q is at the low level for receiving and at the high level for not receiving, a level signal needs to be reversed through the U1C unit, the high level is output at the the U1C unit, the RXD-Q obtains the high level, and the node is unable to receive the signal;

when the node does not send the data, the TXD-Q is at the high level, the U1A unit is at a high resistance, the OE end of the U1B unit is at the low level, and the OneBUS signal at the bus is sent to the OE end of the U1C unit through the U1B unit, and the U1C unit serves as a phase inverter at the moment, so that the level of the RXD-Q is opposite to that of the OneBUS, and the node can receive the data of the bus.

It should be noted that the both the first transmission detection circuit and the second transmission detection circuit can use a chip of which the model is SN74LV4T125.

In the technical field of well drilling, due to the fact that a single-line data transmission method of drilling equipment in the prior art is too complex and not suitable for downhole working conditions, for this purpose, the embodiment of the description can be applied to the drilling equipment, and the method includes:

sending, by a master node of the drilling equipment, instruction information of data transmission to a slave node of the drilling equipment through a bus in a preset first cycle;

judging, by the slave node of the drilling equipment, whether data needs to be sent or not according to the instruction information of data transmission;

sending the data to the master node of the drilling equipment through the bus if the slave node of the drilling equipment determines that the data needs to be sent;

determining other slave nodes needing to send data to the master node of the drilling equipment in a preset second cycle; and sending, by other slave nodes of the drilling equipment, the data sequentially to the master node of the drilling equipment according to the preset slave node priority of the drilling equipment and whether the bus is at a preset electric potential or not.

It should be noted that the embodiment of the description provides a short-distance single-line signal transmission hardware circuit, a network is formed on the basis of the short-distance single-line signal transmission hardware circuit, and a plurality of transmission nodes may be mounted on the network to meet a communication requirement of a drilling instrument string.

It should be noted that the embodiment of the description can describe a transmission communication protocol between the master node and the slave nodes in the network equipment, specifically including:

(1) there are multiple nodes on the network, a certain node may be selected as a master (a master node) and other nodes may be selected as slaves (slave nodes) during initialization, and moreover, the master may be numbered as 0, and the slaves may be numbered as 1, 2, 3 . . . n.

(2) the master sequentially reads data information of the slaves every T time. Wherein, T includes T1 and T2, referring to FIG. 3, T1 may be the first cycle, and T2 may be the second cycle.

(3) each cycle T is composed of two parts, namely T1 and T2, T1 is the time period at which the master performs data acquisition on the slaves, and T2 is the time period at which each slave autonomously uploads the data.

Figure 6:
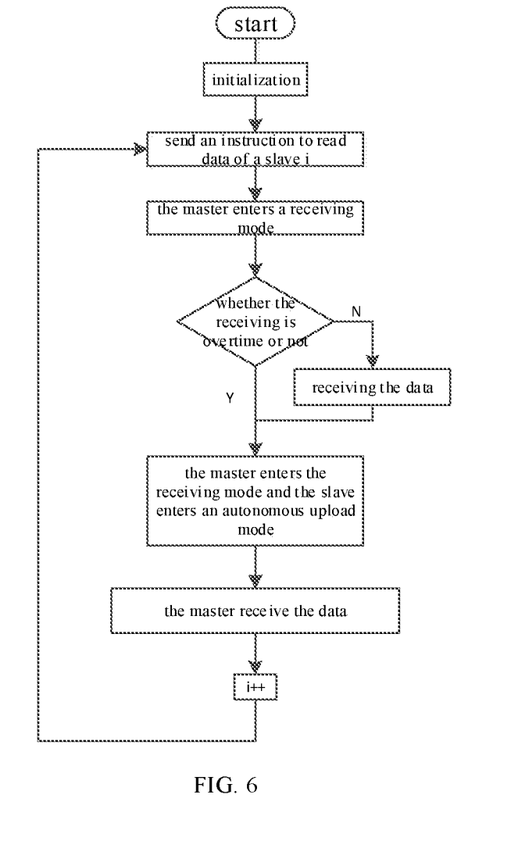
FIG. 6 is a network equipment data protocol flow diagram provided by an embodiment of the description.

(4) FIG. 6 illustrates a network equipment data protocol flow diagram, with the specific flow as follows:

1) at the T1 time period, the master sends a command asking for obtaining data of a certain slave, then releases the bus, and the master enters a data receiving state;

2) after receiving a data packet, the slave judges whether to send the data or not, if the data needs to be sent, the slave uploads the data and occupies the bus, and the slave can enter a receiving mode (T2) whether the receiving is timed out or not, if the data does not need to be sent, each slave continues to wait, and enters an autonomous upload mode after the T1 time period is over, namely, enter the T2 stage;

3) at the T2 time period, the slaves are in two states (a data state and a data-free state), and each slave sends the data according to the preset priority (e.g. p1, p2 . . ., pn, p1<p2<p3 ... pn), with the strategy of: dividing the T2 time period into a plurality of sub-time periods, enabling the p1 to enter an upload mode according to the priority sequence, if there is no data in the p1, sending "no data", determining, by the p2, that the bus is not occupied, and enabling the slave p2 to enter the upload mode; if there is data in the p1, sending "there is data", then sending the data of the p1, and judging whether the bus is occupied or not when there is data in the p2, and continuing to wait if the bus is occupied, and if the bus is not occupied, enabling the slave p2 to enter the upload mode, and sequentially enabling p3 ... pn to enter the upload mode.

4) the master performs data receiving after receiving the data sent by the slaves.

It should be noted that in the embodiment of the description, a certain node may serve as a master node to undertake network scheduling and data collection functions, and other nodes may serve as slave nodes to communicate with the master node, thereby receiving instructions and configurations issued by the master node and reporting a state of a local machine, acquired data and the like. Data transmission networks of the master node and the slave nodes may adopt a polling mode, and after polling is over each time, each slave node can autonomously upload data according to a specified protocol to cope with emergency situations.

It should be noted that in the embodiment of the description, a network cable is formed by connecting a ground line and a signal line, two-way transmission of data can be achieved on the signal line and is therefore called single-line signal transmission.

It should be noted that the all nodes on the network equipment of the embodiment of the description are loaded with signal modulation circuits, with signal characteristics that:

(1) the bus level standard is compatible with TTL, that is, the high level is 5V, and the low level is 0V. The bus idle level may be selected as high level or the low level; and (2) a bus signal is a serial port UART format after being demodulated, that is, the bus signal can directly communicate with the UART of the node on the bus.

The embodiment of the application further provides data transmission equipment based on a single line, and the equipment includes:

at least one processor; and a memory connected to the at least one processor; wherein, the memory stores instructions executable by the at least one processor, and the instructions are executed by the at least one processor, thereby causing the at least one processor to:

send, by a master node, instruction information of data transmission to a slave node through a bus in a preset first cycle;

judge, by the slave node, whether data needs to be sent or not according to the instruction information of data transmission;

send the data to the master node through the bus if the slave node determines that the data needs to be sent; and send, by the other slave nodes, the data sequentially to the master node according to the preset slave node priority, the electric potential condition of the bus and the data state of the other slave nodes in a preset second cycle, wherein the electric potential condition of the bus is detected through a data transmission detection circuit.

The above is only a preferred specific embodiment of the present disclosure, but the scope of the present disclosure is not limited thereto, and any variation or replacement that can be easily thought by any skilled in the art within the technical scope disclosed by the present disclosure shall fall within the protection scope of the present disclosure. Therefore, the scope of the present disclosure should be subject to the scope of the claims.

The invention claimed is:

1. A data transmission method based on a single line, wherein the method is applied to drilling equipment, and comprises:

performing, by a master node of the drilling equipment, data acquisition on a specified slave node of the drilling equipment, and sending instruction information of data transmission to a slave node through a bus in a preset first cycle;

judging, by the slave node of the drilling equipment, whether data needs to be sent or not according to the instruction information of data transmission;

sending the data to the master node of the drilling equipment through the bus under the condition that the slave node of the drilling equipment determines that the data needs to be sent; and uploading, by the slave node of the drilling equipment, the data autonomously to cope with an emergency situation of the slave node of the drilling equipment in a preset second cycle, wherein the emergency situation may be a failure alarm; sending, by other slave nodes, the data to the master node sequentially through the bus according to a preset slave node priority, an electric potential condition of the bus and a data state of the other slave nodes; and wherein the data state of the other nodes comprises data upload and no data upload;

the step of sending, by other slave nodes of the drilling equipment, the data to the master node sequentially through the bus according to the preset slave node priority of the drilling equipment, the electric potential condition of the bus and the data state of the other slave nodes specifically comprises the following steps:

judging whether there are other slave nodes sending data to the master node according to the data state of the other slave nodes;

judging, by other slave nodes, whether the bus is at a preset electric potential or not according to the preset slave node priority under the condition that it is determined that there are other slave nodes sending data to the master node, and sending the data to the master node through the bus when it is determined that the bus is at the preset electric potential; and leaving the data upload for the next cycle if the other slave nodes fail to complete data uploading after the time of the second cycle has passed;

the step of sending, by the other slave nodes, the data to the master node sequentially through the bus according to the preset slave node priority, the electric potential condition of the bus and the data state of the other slave nodes comprises:

judging whether the bus is at the preset electric potential according to the preset slave node priority when the data state of the other slave nodes is the data upload, and sending the data to the master node through the bus when it is determined that the bus is at the preset electric potential; and detecting the electric potential condition of the bus through a data transmission detection circuit, wherein the preset electric potential is a first electric potential or a second electric potential, wherein the first electric potential is an electric potential at which a first transmission detection circuit detects that the bus is idle, the second electric potential is an electric potential at which a second transmission detection circuit detects that the bus is idle, and the first electric potential is greater than the second electric potential;

the second transmission detection circuit comprises a second sending port, a second receiving port, a bus and a second detection module, wherein, the master node and the slave nodes are all connected to a second serial port through the second sending port and the second receiving port;

the second serial port is connected to the bus; and the second detection module is connected to the second receiving port, the second sending port and the bus.

2. The data transmission method based on a single line according to claim 1, wherein the data state of the other slave nodes comprises data upload and no data upload.

3. The data transmission method based on a single line according to claim 1, wherein the first transmission detection circuit comprises a first sending port, a first receiving port, a bus and a first detection module, wherein, the master node and the slave nodes are all connected to a first serial port through the first sending port and the first receiving port;

the first serial port is connected to the bus; and the first detection module is connected to the first receiving port, the first sending port and the bus.

4. The data transmission method based on a single line according to claim 3, wherein the first detection module comprises three units, wherein the first detection module comprises a first unit, a second unit and a third unit;

a first end of the first unit is connected to the first sending port, a second end of the first unit is connected to a high electric potential, and a third end of the first unit is grounded and connected to a first end of the third unit;

a first end of the second unit is connected to the first sending port, a second end of the second unit is grounded, and a third end of the second unit is connected to the high electric potential and the bus; and the first end of the third unit is grounded and connected to the third end of the first unit, a second end of the third unit is connected to the bus, and a third end of the third unit is connected to the first receiving port and the high electric potential.

5. The data transmission method based on a single line according to claim 1, wherein the second detection module comprises four units, wherein the second detection module comprises a fourth unit, a fifth unit, a sixth unit and a seventh unit;

a first end of the fourth unit is connected to the second sending port, a second end of the fourth unit is connected to a high electric potential, and a third end of the fourth unit is grounded and connected to a first end of the fifth unit;

the first end of the fifth unit is grounded and connected to the third end of the fourth unit, a second end of the fifth unit is connected to the bus, and a third end of the fifth unit is grounded and connected to a first end of the sixth unit;

the first end of the sixth unit is grounded and connected to the third end of the fifth unit, a second end of the sixth unit is connected to the high electric potential, and a third end of the sixth unit is grounded and connected to the second receiving end; and a first end of the seventh unit is connected to the second sending port, a second end of the seventh unit is connected to the high electric potential, and a third end of the seventh unit is grounded and connected to the bus.

6. Data transmission equipment based on a single line, wherein the equipment comprises:

at least one processor; and a memory connected to the at least one processor; wherein, the memory stores instructions executable by the at least one processor, and the instructions are executed by the at least one processor, thereby causing the at least one processor to:

perform, by a master node, data acquisition on a specified slave node and send instruction information of data transmission to the slave node through a bus in a preset first cycle;

judge, by the slave node, whether data needs to be sent or not according to the instruction information of data transmission;

send the data to the master node through the bus under the condition that the slave node determines that the data needs to be sent; and upload, by the slave node, data autonomously in a preset second cycle to cope with an emergency situation of the slave node, wherein the emergency situation may be a failure alarm; send, by the other slave nodes, the data sequentially to the master node through the bus according to a preset slave node priority, an electric potential condition of the bus and a data state of the other slave nodes; and wherein the data state of the other slave nodes comprises data upload and no data upload;

the step of sending, by the other slave nodes, the data sequentially to the master node through the bus according to the preset slave node priority, the electric potential condition of the bus and the data state of the other slave nodes specifically comprises the following steps:

judging whether there are other slave nodes sending data to the master node according to the data state of the other slave nodes;

judging, by the other slave nodes, whether the bus is at a preset electric potential or not according to the preset slave node priority under the condition that it is determined that there are other slave nodes sending data to the master node, and sending the data to the master node through the bus when it is determined that the bus is at the preset electric potential; and leaving the data upload for the next cycle under the condition that the other slave nodes fail to complete data upload after the time of the second cycle has passed;

the step of sending, by the other slave nodes, the data to the master node sequentially through the bus according to the preset slave node priority, the electric potential condition of the bus and the data state of the other slave nodes comprises:

judging whether the bus is at the preset electric potential according to the preset slave node priority when the data state of the other slave nodes is the data upload, and sending the data to the master node through the bus when it is determined that the bus is at the preset electric potential; and detecting the electric potential condition of the bus through a data transmission detection circuit, wherein the preset electric potential is a first electric potential or a second electric potential, wherein the first electric potential is an electric potential at which a first transmission detection circuit detects that the bus is idle, the second electric potential is an electric potential at which a second transmission detection circuit detects that the bus is idle, and the first electric potential is greater than the second electric potential;

the second transmission detection circuit comprises a second sending port, a second receiving port, a bus and a second detection module, wherein, the master node and the slave nodes are all connected to a second serial port through the second sending port and the second receiving port;

the second serial port is connected to the bus; and the second detection module is connected to the second receiving port, the second sending port and the bus.

\* \* \* \* \*